UNITED STATES PATENT OFFICE.

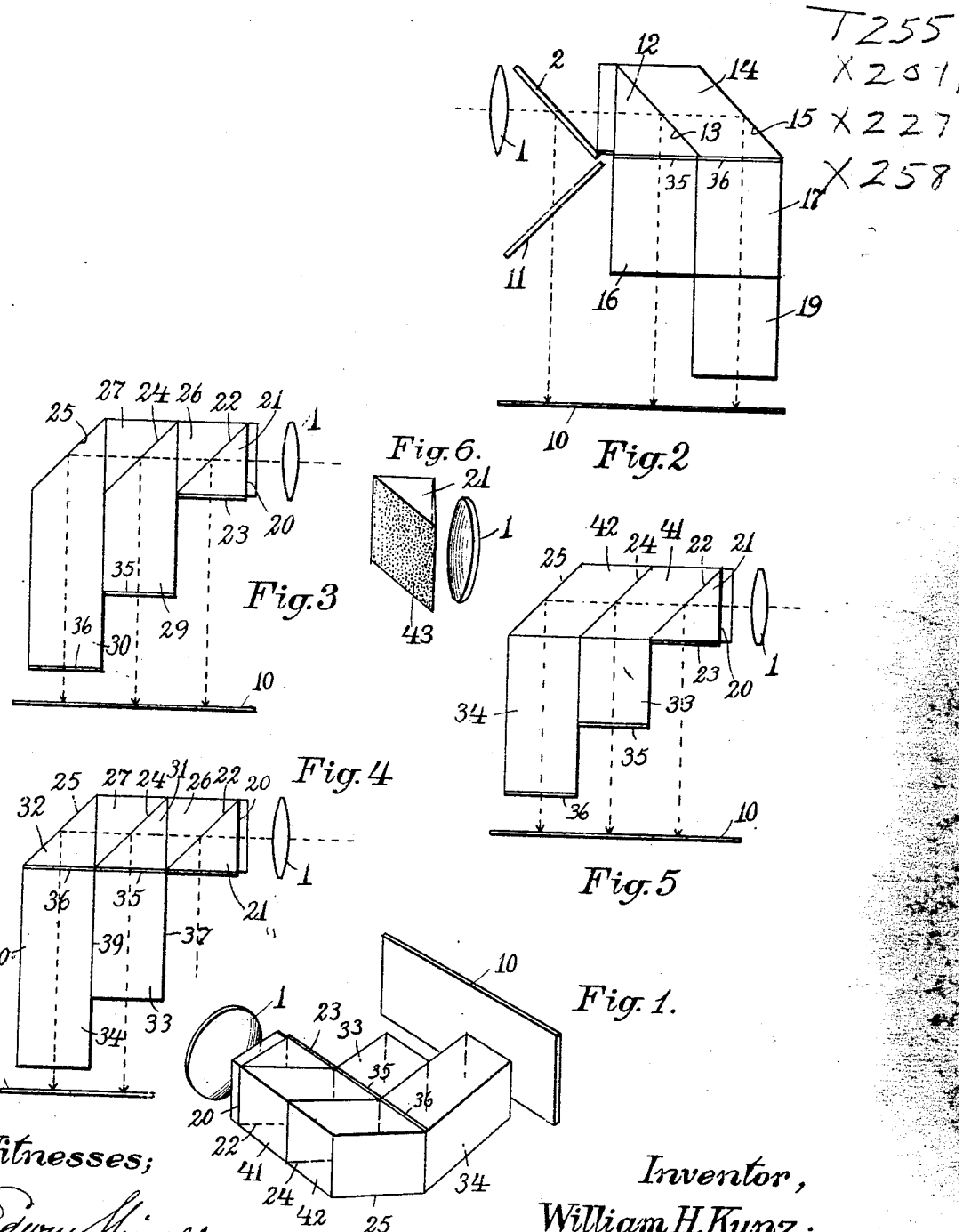

WILLIAM H. KUNZ, OF BOSTON, MASSACHUSETTS, ASSIGNOR TO KUNZ-GARNISS COMPANY, A CORPORATION OF MASSACHUSETTS.

LIGHT-DIVIDING DEVICE.

1,319,292.          Specification of Letters Patent.      Patented Oct. 21, 1919.

Application filed October 1, 1914, Serial No. 864,387. Renewed December 11, 1915. Serial No. 66,398.

*To all whom it may concern:*

Be it known that I, WILLIAM H. KUNZ, a citizen of the United States, and a resident of Boston, in the county of Suffolk and Commonwealth of Massachusetts, have invented certain new and useful Improvements in Light-Dividing Devices, of which the following is a full, clear, and exact specification.

One of the most essential features in connection with color photography is that of insuring the accurate matching of corresponding elements in the multiple pictures taken from a single image, whether the pictures are two, three or more in number. Another important feature is that of reducing to a minimum the number of reflections required for separating the original light rays into a plurality of duplicate sets. Still another is that of so taking the pictures that no one will be reversed relative to the others.

The purpose of this invention is the construction of a multi-color camera which shall have above mentioned features, and in addition, certain others to be hereinafter set forth.

Referring to the drawings forming part of this specification, Figure 1 is a perspective view, in diagram, of a camera disposed for taking simultaneously three like photographs. Fig. 2 is a plan view of a camera wherein but one mirror is used, glass prisms being employed for effecting the remainder of the functions required. Fig. 3 is a plan view of a construction using glass prisms exclusively. Fig. 4 is a plan view of a construction similar to that shown in Fig. 3, the only difference being those arising from the employment of different kinds and proportions of glass, in each case two kinds of glass of different refractive index being used. Fig. 5 is an all-glass device composed of material having the same refractive index throughout. Fig. 6 is a perspective view of a prism having a partial reflecting surface.

One of the features common to all the constructions set forth herein is that of having three reflecting surfaces all parallel with their centers in the same straight line and so disposed relative to the light rays concentrated on one of the surfaces by a lens that the rays reflected therefrom will be thrown in the same direction, two of the surfaces being partially reflecting and the third being wholly reflecting.

In the construction shown in Fig. 2, one mirror alone is used, the other reflecting surfaces being formed by prisms. Here the mirror 2 reflects a portion of the light received through the lens 1 to the sensitive surface 10, passing on its way through an oblique glass plate 11 in order to give the reflected rays the degree of refraction which is received by the rays passing through the partially reflecting mirror 2. These latter rays pass through the triangular prism 12 to its partially reflecting surface 13, and are partially reflected to the sensitive surface 10 at another section thereof. The remainder of the rays pass on through the oblique parallelepiped 14 to its wholly reflecting surface 15, and are diverted thereby to still another section of the sensitive plate 10.

Since the reflecting surfaces 15 and 13 are farther from the lens than the mirror 2, it is necessary to provide some means for lengthening out the focusing lengths for the rays from said surfaces 15, 13 in order to bring all three sets of rays to focus on a common surface. To do this, a single block of glass 16 is put into the path of the rays from the reflecting surface 13, and either two blocks 17, 19 or a single long block put in the path of the other rays.

In the forms of construction illustrated in Figs. 1, 3, 4 and 5, there are no mirrors, but glass prisms and blocks are solely used. In each case, the light rays from the lens 1 penetrate at right angles the vertical surface 20 of a triangular prism 21, and a portion of the rays are diverted by the partially reflecting surface 22 to the sensitive surface 10, passing in their way through a color filter 23.

The undiverted rays pass on through another prism to the partially reflecting surface 24 by which a portion are reflected at right angles to another section of the surface 10; and the remainder of the rays traverse another prism to the wholly reflecting surface 25 by which they are reflected to a third section of the surface 10.

In the construction shown in Fig. 3, only five separate members are used, the same comprising three equal right-angled triangles 21, 26 and 27, and two elongated blocks 29 and 30 carrying the oblique surfaces 24, 25 respectively. In the constructions shown in Fig. 4 seven members are represented, consisting of the equal triangular prisms 21, 26 and 27, and 31 and 32, with the rectangular blocks 33, 34. This latter construction has certain advantages over the one set forth in Fig. 3 in that it provides protected places for the color filters 35, 36.

In each of the arrangements, the prisms, blocks and color filters are strongly cemented together, with the surfaces 37, 39 and 40 blackened or otherwise rendered opaque.

In each of the constructions it will be seen that there are three parallel reflecting surfaces adapted to focus separated sets of light-rays upon a single plane surface to require but a single reflection of each set; to have all the images accurately match, and none to be reversed. The reasons for the different lengths of the blocks in the constructions illustrated in Figs. 3, 4 and 5 are as follows: In Fig. 3, the prisms 21, 26 are supposed to be composed of crown glass, while the other members are of flint glass. In Fig. 4, the members 21, 26, 27, 31 and 33 are of crown glass, and 25 and 34 of flint glass. In Fig. 5, all the members are composed of the same kind of glass, preferably heavy flint, as also in Fig 1.

The construction set forth in Fig. 5 differs from that illustrated in Fig. 4 in the substitution of the two oblique parallelepipeds 41, 42 for the four triangular prisms 26, 27, 31 and 32, and also in cementing the color filters 35, 36 to the exposed ends of the blocks 33 and 34 instead of between the latter and the reflecting prisms.

Fig. 1 differs from Fig. 5 only in the arrangement of said color filters.

I have found that a partially reflecting surface or mirror does not reflect a cone of light alike throughout its surface, but from the part nearer the lens less light will be reflected than from the part farther away from the lens. Hence one section of the photograph would be less exposed than the other.

After considerable study, I discovered the cause to be owing to the fact that the light rays struck the oblique surface more nearly vertical upon the part nearer the lens, while their angle with the farther part of said surface was more nearly acute; for the more nearly acute the angle, the more the glass surface alone acted as a mirror; while the more nearly at right angles, the less the reflecting action of the glass surface.

To correct this most vital difficulty, I simply apply the silver, platinum or other metal in a much thinner or more incomplete coating to the more distant part of the reflecting surface, and coat more fully the nearer part of the surface, until the light reflected is uniform throughout the entire surface of the mirror or prism, as shown in Fig. 6 at 43.

It should be noted that whether the reflecting surfaces are partially mirrors and partly prisms, as in Fig. 2, or all prisms, as in the remainder of the figures, there are several features in common: First, the sensitive surface is parallel with the original direction of the light rays to the lens. There are three parallel reflecting surfaces so disposed that all the reflected rays come to focus upon the same plane. The images on the sensitive surface all face the same way, and are all exactly the same size.

What I claim is:

1. A light dividing device comprising a compound prism having a sealed in partially reflecting surface oblique to the plane of a supported sensitive surface, a wholly reflecting surface parallel with the partially reflecting surface, and a block of glass for lengthening the path of rays which are reflected by the wholly reflecting surface.

2. A light dividing device comprising a compound prism composed of a glass prism in the form of an oblique parallelepiped, both oblique surfaces being reflecting, one partially so, a triangular prism having its hypotenuse cemented to the partially reflecting surface, and a glass block cemented to a non-reflecting surface of the parallelepiped.

3. A multi-color camera comprising a lens, means for supporting a sensitive surface, and a compound prism having a plurality of sealed in partially reflecting surfaces oblique to the axis of the lens but parallel with each other, a wholly reflecting surface parallel with said partially reflecting surfaces, and glass blocks for lengthening out the paths of light from certain of the reflecting surfaces to the sensitive surface.

4. A color camera comprising a lens, means for supporting a sensitive surface, and a partially reflecting surface oblique to the axis of the lens, said oblique surface having means for equalizing the reflecting qualities of outer sections thereof.

5. A color camera comprising a lens, means for supporting a sensitive surface, and a partially reflecting surface oblique to the axis of the lens, said reflecting surface being composed of a transparent material having an incomplete coating of reflecting material thereon, said reflecting material being more incomplete upon the section of the reflecting surface farthest removed from the lens.

6. A color camera comprising a lens, and a partially reflecting surface oblique to the axis of the lens, the reflecting surface being composed of a transparent material having a coating of metal deposited thereon in minute particles separated somewhat from each other, said particles being more numerous at one edge than at another.

7. A color camera comprising a lens, and a partially reflecting surface oblique to the axis of the lens, the reflecting surface being composed of a transparent material having a coating of metal deposited thereon in minute particles, the coating being heavier on the portion nearest the lens.

In testimony that I claim the foregoing invention, I have hereunto set my hand this 28th day of September, 1914.

WILLIAM H. KUNZ.

Witnesses:
  LOWELL M. MAXHAM,
  A. B. UPHAM.

Copies of this patent may be obtained for five cents each, by addressing the "Commissioner of Patents, Washington, D. C."